(12) United States Patent
Montana et al.

(10) Patent No.: US 6,769,112 B1
(45) Date of Patent: Jul. 27, 2004

(54) DOMAIN-INDEPENDENT RECONFIGURABLE SCHEDULER

(76) Inventors: David J. Montana, 15 Hathaway Cir., Arlington, MA (US) 02476; José Luis Herrero, 2 Morrison Ave., Somerville, MA (US) 02144; Sean Moore, 20 Mendelssohn Dr., Hollis, NH (US) 03049

( * ) Notice: Subject to any disclaimer, the term of this patent is extended or adjusted under 35 U.S.C. 154(b) by 0 days.

(21) Appl. No.: 09/502,476

(22) Filed: Feb. 11, 2000

(51) Int. Cl.[7] .............................................. G06F 9/44
(52) U.S. Cl. ........................ 717/101; 718/100; 705/9; 715/513
(58) Field of Search ......................... 717/101, 102–124; 718/100–107; 705/7–11; 715/513

(56) References Cited

U.S. PATENT DOCUMENTS

| | | | | |
|---|---|---|---|---|
| 5,649,185 A | * | 7/1997 | Antognini et al. | 707/9 |
| 5,848,403 A | | 12/1998 | Gabriner et al. | 706/13 |
| 6,058,413 A | * | 5/2000 | Flores et al. | 709/101 |
| 6,094,688 A | * | 7/2000 | Mellen-Garnett et al. | 709/328 |
| 6,154,738 A | * | 11/2000 | Call | 707/4 |
| 6,405,364 B1 | * | 6/2002 | Bowman-Amuah | 717/101 |
| 6,442,563 B1 | * | 8/2002 | Bacon et al. | 705/8 |

OTHER PUBLICATIONS

M. McIlhagga, "Solving Generic Scheduling Problems with a Distributed Genetic Algorithm," Proceedings of the ASIB Workshop on Evolutionary Computing, 1997.
E. Davis and M. Fox, "ODO: A Constraint–based Architecture for Representing and Reasoning About Scheduling Problems," Proceedings of the 3rd Industrial Engineering Research Conference, 1994.

* cited by examiner

*Primary Examiner*—Antony Nguyen-Ba
(74) *Attorney, Agent, or Firm*—Ropes & Gray LLP

(57) ABSTRACT

A domain-independent, reconfigurable scheduling system (100) is provided. The scheduling system (100) receives a data object describing one or more resources to be scheduled. The data object is related to the domain for which the scheduling system (100) is being configured. The scheduling system (100) also receives scheduling semantics related to the domain. The scheduling semantics are received in the form of non-compiled data. The scheduling system (100) may then be configured for the domain using the data object and scheduling semantics.

39 Claims, 5 Drawing Sheets

DOMAIN-INDEPENDENT RECONFIGURABLE SCHEDULER

STATEMENT REGARDING FEDERALLY SPONSORED RESEARCH OR DEVELOPMENT

This invention was made with Government support under Contract No. MDA 972-97-C-0800, awarded by Defense Advance Research Project Agency. The Government has certain rights in this invention.

FIELD OF THE INVENTION

The present invention relates generally to schedulers and, more particularly, to a domain-independent, reconfigurable scheduler.

BACKGROUND OF THE INVENTION

Automated scheduling systems have existed for years. These systems have been used for creating schedules in a wide range of domains. For example, a particular scheduler may be used to schedule tasks on a busy factory floor, to schedule service visits by multiple repair people, to schedule taxicabs to pickups, to schedule personnel to shifts, etc.

Often times, programmers are used to develop a particular scheduler from scratch (i.e., programmers write code for the particular domain of operation). When a scheduler is to operate in multiple domains, programmers typically build a common base code and then create domain-specific code on top of this base code for each domain. The problem with the above two scenarios is that it is costly to write domain-specific code, and writing this code often requires special knowledge about the base code.

Therefore, there exists a need for a system and method that can quickly and inexpensively provide schedules independent of the specific domain of operation.

SUMMARY OF THE INVENTION

Systems and methods consistent with the present invention address this and other needs by providing a mechanism by which a scheduler can be easily and inexpensively reconfigured for different domains.

In accordance with the purpose of the invention as embodied and broadly described herein, a method for configuring a scheduler includes receiving at least one data object related to a domain, the at least one data object describing one or more resources available to be scheduled; receiving scheduling semantics related to the domain, the scheduling semantics being received as non-compiled data; and configuring the scheduler for the domain using the at least one data object and scheduling semantics.

In another implementation consistent with the present invention, a method for scheduling a use of a resource includes receiving a data object describing a task to be scheduled, the data object being received as non-compiled data; and determining a schedule for the resource based on the received data object, at least one data object that describes the resource, and a group of scheduling semantics.

In a further implementation consistent with the present invention, a method for reconfiguring a scheduler that has been configured for a first domain includes receiving scheduling semantics related to a second, different domain, the scheduling semantics being received as non-compiled data; receiving at least one data object related to the second domain, the at least one data object describing one or more resources available to be scheduled; and configuring the scheduler for the second domain using the at least one data object and scheduling semantics.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a process by which a scheduler can be quickly and inexpensively reconfigured for a variety of different domains. Implementations consistent with the present invention use data for specifying the full semantics and logic (not just parameters) of a scheduling system. As such, writing code for each specific domain in which the scheduling system operates can be avoided.

EXEMPLARY SYSTEM

Figure 1:
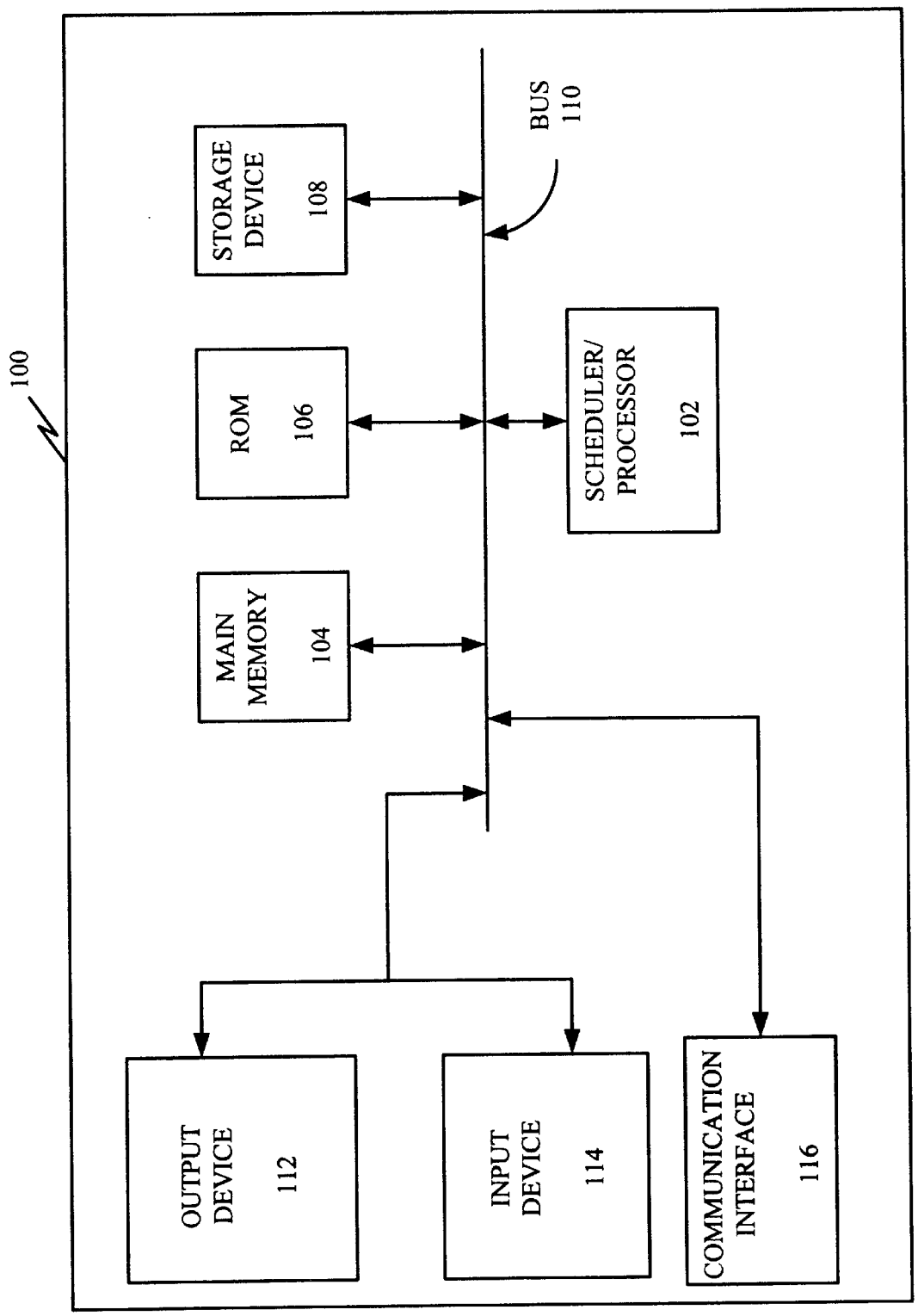
FIG. 1 illustrates an exemplary system in which a scheduler, consistent with the present invention, may be implemented.

FIG. 1 illustrates an exemplary system 100 in which a scheduler, consistent with the present invention, may be implemented. In FIG. 1, the exemplary system 100 includes a scheduler/processor 102, main memory 104, read only memory (ROM) 106, storage device 108, bus 110, output device 112, input device 114, and communication interface 116.

Figure 2:
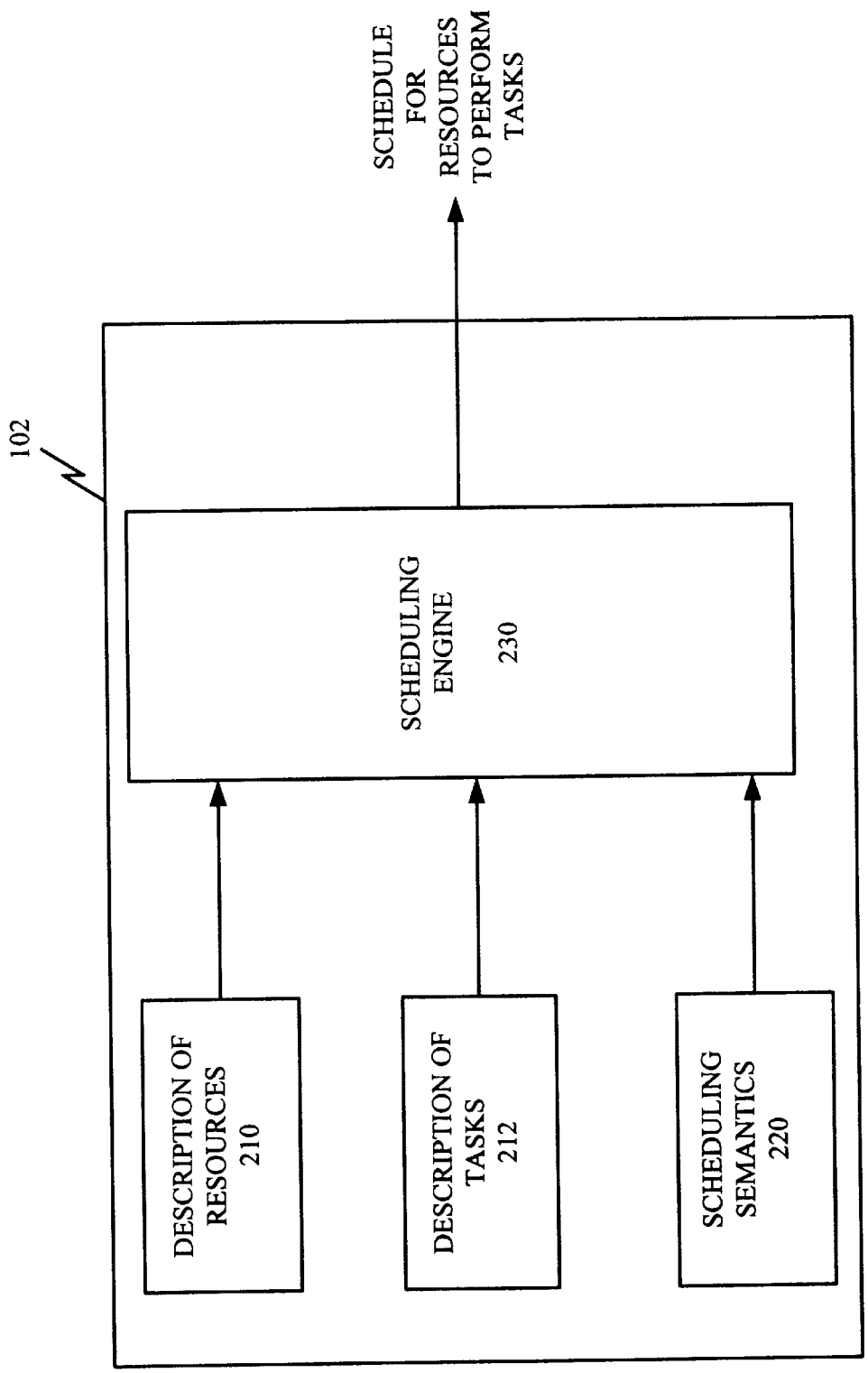
FIG. 2 illustrates an exemplary configuration of the scheduler 102 of FIG. 1.

A scheduler 102, consistent with the present invention, includes a scheduler that is both domain-independent and reconfigurable. As will be described in more detail below, the scheduler 102 uses non-compiled data structures, rather than code, for domain-specific objects internal to the scheduler. As such, the scheduler 102 can be reconfigured for different domains (or problems) without having to write additional code specifically for each of the different domains. FIG. 2 illustrates an exemplary configuration of the scheduler 102 of FIG. 1.

In FIG. 2, the scheduler 102 includes a description of resources module 210, a description of tasks module 212, a scheduling semantics module 220, and a scheduling engine 230.

The description of resources module 210 stores data objects that describe the resources available for performing tasks. The description of resources information may be as general or detailed as necessary for the scheduler 102 to determine a useful schedule. The data objects stored in the description of resources module 210 are preferably specified as an eXtensible Markup Language (XML) Document Type Definition (DTD). XML provides the ability to represent complex, nested objects. As such, the XML specification lends itself well to use in schedulers where resource objects may contain sets of subobjects. For example, a resource object, such as a laser printer, may include a list of qualification subobjects (e.g., that the laser printer only produces black and white printouts) and a list of time block subobjects specifying when the laser printer is not available due to other commitments. It will be appreciated that other types of data object specifications may alternatively be used in place of XML.

The description of tasks module 212 stores data objects that describe the tasks to be performed by one or more of the resources contained in the description of resources module 210. Again, the information quantity and content may be as general or detailed as is necessary for the scheduler 102 to produce a useful schedule. The data objects stored in the description of tasks module 212 are also preferably specified as an XML DTD. It will be appreciated that the data objects may alternatively use other types of data object specifications.

The scheduling semantics module 220 stores configuration data that specifies scheduling semantics (i.e., the constraints, rules, and objectives that define how the scheduler will operate to produce schedules). Included, for example, in the scheduling semantics module 220 are specifications for:

How to determine whether a resource is capable of performing a particular task;

How to determine task setup, performance, and cleanup durations;

Whether a resource can perform multiple tasks simultaneously, and if so, which tasks can be performed simultaneously and what is the resource's capacity;

How to determine when tasks and resources are available for scheduling; and

The criteria for determining the performance of a schedule and whether one schedule is better than another schedule.

The scheduling semantics refer to the structures of the data objects stored in the description of resources module 210 and description of tasks module 212. The scheduling semantics indicate how to navigate the data objects to find the required fields. The scheduling semantics are preferably specified using XML or some other type of textual representation.

Although the resource descriptions, task descriptions, and scheduling semantics are illustrated as contained in the scheduler 102, other configurations are possible. For example, the information may be stored externally, such as in memory 104 or 108, stored in one or more separate computer systems or databases, or entered by a user. If, for example, the resource description data objects do not change very often, they may be stored inside the scheduler 102 or system 100. If the task description data objects change on a daily (or regular) basis, they may be stored on a separate task entry system, and then provided to the scheduler 102 when a schedule is to be produced.

The scheduling engine 230 may include a processor that executes instructions for providing an optimized schedule based on information received from the modules 210, 212, and 220.

Returning to FIG. 1, main memory 104 may be a random access memory (RAM) or a similar dynamic storage device that stores instructions for execution by the scheduler 102. Main memory 104 may also store configuration data or other intermediate information used during execution of instructions for use by scheduler 102. Read only memory (ROM) 106 may include a conventional ROM device or some other type of static storage device that stores static information and instructions for scheduler 102. The data storage device 108 may include any type of magnetic or optical disk and its corresponding disk drive. Data storage device 108 stores information and instructions for use by scheduler 102. Bus 110 includes a set of hardware lines (conductors) that allows for data transfer among the components of the system 100.

The output device 112 includes one or more devices for providing information to an operator. The output device 112 may include, for example, a display, a printer, a pair of speakers, etc. The input device 114 may include one or more devices that allow the operator to interact with the system 100. The input device 114 may include, for example, a keyboard, a mouse, a pen, voice recognition and/or biometric mechanisms, and the like.

Communication interface 116 enables the system 100 to communicate with other devices/systems via any communications medium. For example, communication interface 116 may be a modem or an, Ethernet interface to a local area network (LAN). Alternatively, communication interface 116 may be any other interface that enables communication between the system 100 and other devices or systems.

The system 100 performs the functions necessary to schedule a variety of different tasks in different domains in response to scheduler 102 executing sequences of instructions contained in, for example, memory 104. Such instructions may be read into memory 104 from another computer-readable medium, such as data storage device 108, or from another device via communication interface 116. Execution of the sequences of instructions contained in memory 104 causes scheduler 102 to perform a method that will be described hereafter. Alternatively, hardwired circuitry may be used in place of or in combination with software instructions to implement the present invention. Thus, the present invention is not limited to any specific combination of hardware circuitry and software.

As described above, a scheduler consistent with the present invention uses non-compiled data structures to represent domain-specific objects internal to the scheduler. As such, the scheduler can be easily reconfigured to produce schedules for a variety of different problems (i.e., domains) without having to write additional code specifically for each particular problem.

EXEMPLARY PROCESSES

Figure 3:
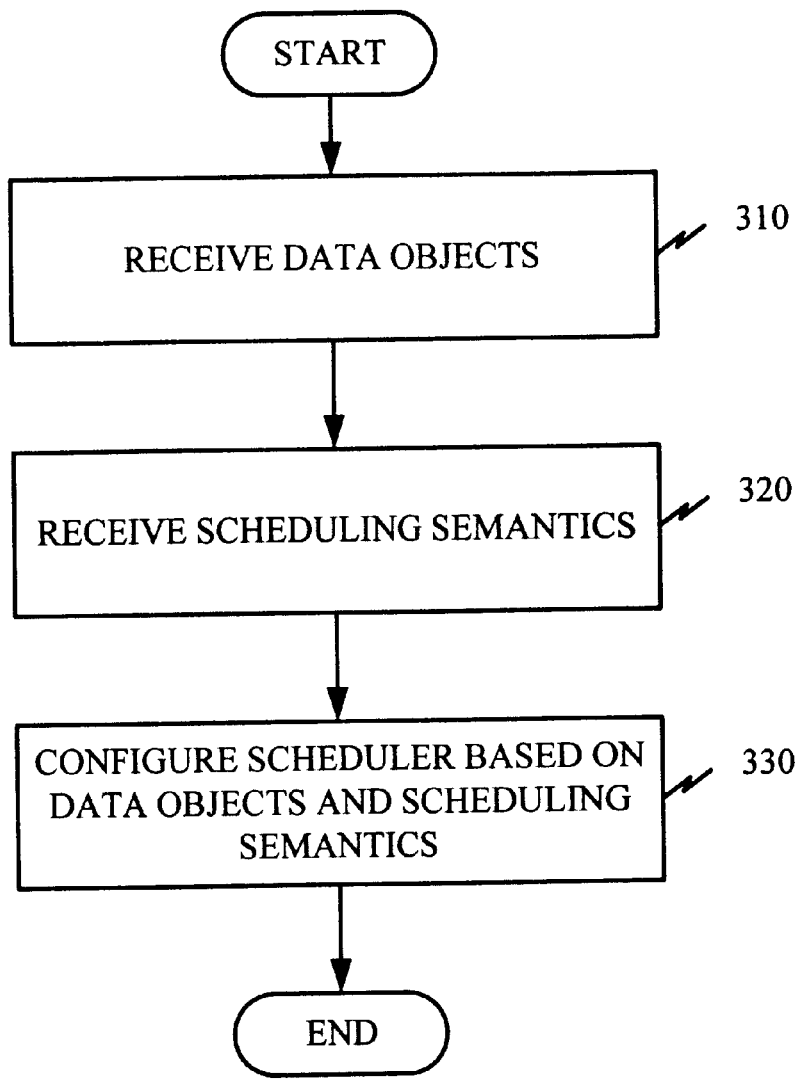
FIG. 3 illustrates an exemplary process, consistent with the present invention, for configuring a scheduler.

FIG. 3 illustrates an exemplary process, consistent with the present invention, for configuring a scheduler, such as scheduler 102. The scheduler 102, and more specifically the scheduling engine 230, receives a group of data objects for a particular problem to be scheduled [step 310]. As described above, the data objects are preferably specified in XML. The data objects include descriptions of the resources that may be scheduled, and may include descriptions of one or more tasks already scheduled to be performed by one or more of the resources.

The scheduling engine 230 also receives a group of scheduling semantics [step 320]. The scheduling semantics, like the data objects, are preferably specified in XML. The use of data, rather than code, to specify the scheduler's scheduling semantics allows the scheduler 102 to be easily reconfigured to produce schedules for a variety of different domains. That is, code need not be written for each domain in which the scheduler 102 operates.

The scheduling engine 230 is then configured by the system 100 using the data objects and scheduling semantics for the particular problem area of interest [step 330]. The scheduler 102 may thereafter accept additional tasks for scheduling for the problem area.

Figure 4:
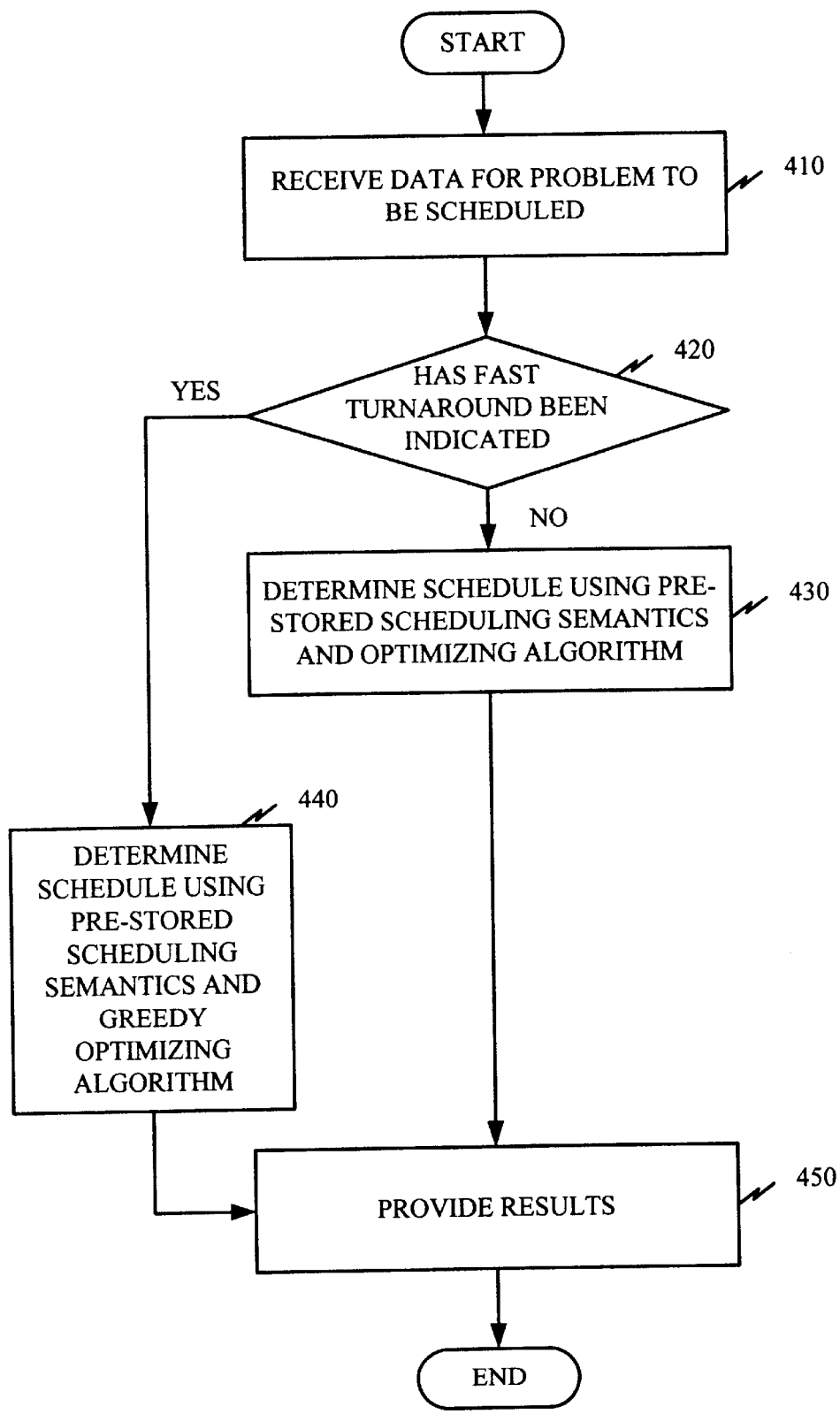
FIG. 4 illustrates an exemplary process, consistent with the present invention, for producing a schedule.

FIG. 4 illustrates an exemplary process, consistent with the present invention, for producing a schedule. When a task is to be scheduled, a scheduler, such as scheduler 102, receives data describing the task [410]. This data may be received from an external source (e.g., entered by a user) and should adhere to the specifications in the XML DTD that defines the structure of the data objects. If a fast turnaround time is specified [step 420], the scheduler 102, and more specifically the scheduling engine 230, performs "greedy" optimized scheduling while taking into consideration the scheduling semantics received during scheduler configuration [step 440]. In greedy scheduling, the scheduling engine 230 takes the tasks in order and assigns each of them in succession to the particular resource(s) that, at that particular time, provides the best schedule according to the evaluation criteria in the scheduling semantics.

If, on the other hand, a fast turnaround time is not specified, then the scheduling engine 230 uses an optimization algorithm, such as a conventional genetic algorithm, to determine the best schedule [step 430]. The genetic algorithm feeds the tasks to the scheduling engine 230 in different orders. The scheduling engine 230 determines which of the orders produces the best schedule.

The scheduler 102 then provides the schedule to the user via the output device 112 [step 450]. The schedule may, for example, be displayed to the user through the use of a graphical user interface (GUI). The GUI allows the user to view schedules, tasks, and resources. In addition, the GUI may allow the user to alter a schedule and/or one or more of the tasks or resources. Due to the format by which the data objects that represent the tasks and resources are stored, this alteration process may be easily performed by an end user. A resulting schedule, and possibly the GUI, may be tailored toward the particular domain in which the scheduler operates.

Figure 5:
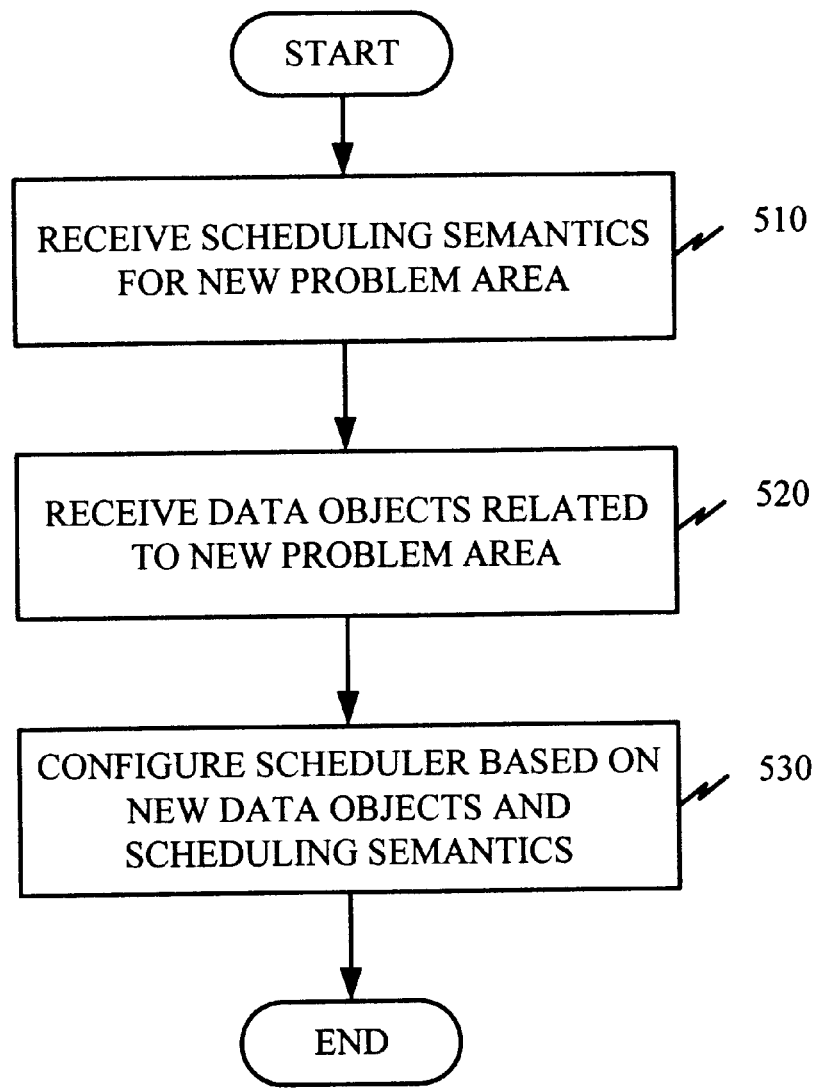
FIG. 5 illustrates an exemplary process, consistent with the present invention, for reconfiguring a scheduler.

FIG. 5 illustrates an exemplary process, consistent with the present invention, for reconfiguring a scheduler. It is assumed that the scheduler (e.g., scheduler 102) has been configured for a first problem area (or domain). In order to reconfigure the scheduler 102 for a second, different problem area, the scheduler 102 receives a new set of scheduling semantics [step 510]. The new set of scheduling semantics should preferably be specified according to XML, or some other type of textual representation.

The scheduler 102 also receives one or more data objects related to the new problem area [step 520]. The data objects should also be specified in XML. The data objects include descriptions of the resources, and may include descriptions of one or more tasks to be scheduled.

The scheduler 102 is then configured for the new problem area using the new scheduling semantics and data objects [step 530].

A domain-independent, reconfigurable scheduler, consistent with the present invention, requires the writing of no additional code for each of the different domains (or problem areas) in which the scheduler operates. This makes the scheduling process less expensive and easier to implement. Moreover, the domain-independent, reconfigurable scheduler allows the end user to perform the configuration process rather than software developers.

CONCLUSION

Systems and methods consistent with the present invention provide a domain-independent, reconfigurable scheduling system. The scheduling system uses noncompiled data structures to represent domain-specific objects internal to the scheduling system. Moreover, the system uses data, rather than separately written code, for specifying the full semantics and logic of the scheduling system.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a series of steps has been presented with respect to FIGS. 3–5, the order of the steps does not matter.

The scope of the invention is defined by the following claims and their equivalents.

What is claimed is:

1. A method for configuring a scheduler comprising:
   receiving at least one data object related to a domain, the at least one data object describing one or more resources available to be scheduled;
   receiving scheduling semantics related to the domain, the scheduling semantics being received as non-compiled data; and
   configuring the scheduler for the domain using the at least one data object and scheduling semantics.

2. The method of claim 1 wherein the receiving at least one data object includes:
   receiving the at least one data object according to an extensible markup language document type definition.

3. The method of claim 1 wherein the receiving scheduling semantics includes:
   receiving the scheduling semantics according to extensible markup language specifications.

4. The method of claim 1 further comprising:
   receiving one or more data objects describing tasks to be performed by the scheduler.

5. The method of claim 4 wherein the receiving one or more data objects includes:
   receiving the one or more data objects according to an extensible markup language document type definition.

6. A system for configuring a scheduler, the system comprising:
   means for receiving data objects related to a domain, at least some of the data objects describing one or more resources available to be scheduled;
   means for receiving scheduling semantics related to the domain, the scheduling semantics being received as non-compiled data; and
   means for configuring the scheduler for the domain using the data objects and scheduling semantics.

7. A system for configuring a scheduler comprising:
   a memory configured to store instructions, data objects that describe resources to be scheduled, and scheduling semantics; and
   a processor configured to execute the instructions to:
      receive at least one data object related to a domain,
      receive scheduling semantics related to the domain, the scheduling semantics being received as non-compiled data, and
      configure the scheduler for the domain using the received at least one data object and scheduling semantics.

8. The system of claim 7 wherein, when receiving the at least one data object, the processor is further configured to:
   receive the at least one data object according to an extensible markup language document type definition.

9. The system of claim 7 wherein, when receiving the scheduling semantics, the processor is further configured to:
receive the scheduling semantics according to an extensible markup language specification.

10. The system of claim 7 wherein the processor is further configured to:
receive one or more data objects describing tasks to be performed by the scheduler.

11. The system of claim 10 wherein, when receiving the one or more data objects, the processor is further configured to:
receive the one or more data objects according to an extensible markup language document type definition.

12. A method for scheduling a use of a resource, the method comprising:
receiving a data object describing a task to be scheduled, the data object being received as non-compiled data; and
determining a schedule for the resource based on the received data object, at least one data object that describes the resource, and a group of scheduling semantics.

13. The method of claim 12 further comprising:
storing, prior to determining, the at least one data object that describes the resource and the group of scheduling semantics, the at least one data object and scheduling semantics being stored according to specifications of an extensible markup language.

14. The method of claim 13 wherein the receiving a data object includes:
receiving the data object according to an extensible markup language document type definition.

15. The method of claim 12 further comprising:
providing the schedule to a user via a graphical user interface.

16. A system for scheduling use of a resource, the system comprising:
a memory configured to store instructions, at least one data object that describes the resource, and scheduling semantics; and
a processor configured to execute the instructions to:
receive a data object describing a task to be scheduled, the data object being received as non-compiled data, and
determine a schedule for the resource based on the received data object and a group of one or more of the scheduling semantics.

17. The system of claim 16 wherein, when receiving a data object, the processor is further configured to:
receive the data object according to an extensible markup language document type definition.

18. The system of claim 16 wherein the memory is configured to:
store the at least one data object and scheduling semantics according to specifications of an extensible markup language.

19. The system of claim 16 further comprising:
a graphical user interface,
wherein the processor is further configured to:
display the schedule to a user via the graphical user interface.

20. A method for reconfiguring a scheduler configured for a first domain, the method comprising:
receiving scheduling semantics related to a second, different domain, the scheduling semantics being received as non-compiled data;
receiving at least one data object related to the second domain, the at least one data object describing one or more resources available to be scheduled; and
configuring the scheduler for the second domain using the at least one data object and scheduling semantics.

21. The method of claim 20 further comprising:
receiving one or more data objects describing tasks to be scheduled; and
scheduling the tasks using the at least one data object and the scheduling semantics.

22. The method of claim 21 wherein the receiving the one or more data objects includes:
receiving the one or more data objects according to an extensible markup language document type definition.

23. The method of claim 20 wherein the receiving the scheduling semantics includes:
receiving the scheduling semantics according to an extensible markup language specification.

24. The method of claim 23 wherein the receiving the at least one data object includes:
receiving the at least one data object according to an extensible markup language document type definition.

25. A system for reconfiguring a scheduler configured for a first domain, the system comprising:
a memory configured to store instructions; and
a processor configured to execute the instructions to:
receive scheduling semantics related to a second, different domain, the scheduling semantics being received as non-compiled data,
receive at least one data object related to the second domain, the at least one data object describing one or more resources available to be scheduled, and
configure the scheduler for the second domain using the at least one data object and scheduling semantics.

26. The system of claim 25 wherein the processor is further configured to:
receive one or more data objects describing tasks to be scheduled; and
schedule the tasks using the at least one data object and the scheduling semantics.

27. The system of claim 26 wherein, when receiving the one or more data objects, the processor is configured to:
receive the one or more data objects according to an extensible markup language document type definition.

28. The system of claim 25 wherein, when receiving the scheduling semantics, the processor is configured to:
receive the scheduling semantics according to an extensible markup language specification.

29. The system of claim 28 wherein, when receiving the at least one data object, the processor is configured to:
receive the at least one data object according to an extensible markup language document type definition.

30. A computer-readable medium containing instructions for controlling at least one processor to perform a method that configures a scheduler, the method comprising:
receiving at least one data object related to a domain, the at least one data object describing one or more resources available to be scheduled;
receiving scheduling semantics related to the domain, the scheduling semantics being received as non-compiled data; and
configuring the scheduler for the domain using the at least one data object and scheduling semantics.

31. The computer-readable medium of claim 30 wherein the receiving at least one data object includes:

receiving the at least one data object according to an extensible markup language document type definition.

32. The computer-readable medium of claim 31 wherein the receiving scheduling semantics includes:

receiving the scheduling semantics according to an extensible markup language specification.

33. A computer-readable medium containing instructions for controlling at least one processor to perform a method that schedules use of a resource, the method comprising:

receiving a data object describing a task to be scheduled, the data object being received as non-compiled data; and determining a schedule for the resource based on the received data object, at least one data object that describes the resource, and a group of scheduling semantics, the at least one data object and the group of scheduling semantics being in the form of non-compiled data.

34. The computer-readable medium of claim 33 further comprising:

providing the schedule to a user via a graphical user interface.

35. A computer-readable medium containing instructions for controlling at least one processor to perform a method that reconfigures a scheduler configured to operate in a first domain, the method comprising:

receiving scheduling semantics related to a second, different domain, the scheduling semantics being received as non-compiled data;

receiving at least one data object related to the second domain, the at least one data object describing one or more resources available to be scheduled; and configuring the scheduler for the second domain using the at least one data object and scheduling semantics.

36. The computer-readable medium of claim 35 further comprising:

receiving one or more data objects describing tasks to be scheduled; and scheduling the tasks using the at least one data object and the scheduling semantics.

37. The computer-readable medium of claim 36 wherein the receiving the one or more data objects includes:

receiving the one or more data objects according to an extensible markup language document type definition.

38. The computer-readable medium of claim 35 wherein the receiving the scheduling semantics includes:

receiving the scheduling semantics according to an extensible markup language specification.

39. The computer-readable medium of claim 38 wherein the receiving the at least one data object includes:

receiving the at least one data object according to an extensible markup language document type definition.

* * * * *